US009122145B2

(12) United States Patent
Kosaka et al.

(10) Patent No.: US 9,122,145 B2
(45) Date of Patent: Sep. 1, 2015

(54) LASER PROJECTOR WITH REDUCED SPECKLE

(75) Inventors: Tadayoshi Kosaka, Yokohama (JP);
Satoshi Ouchi, Kamakura (JP); Mayumi Nagayoshi, Chofu (JP); Yoshiho Seo, Yokohama (JP); Tomoki Kobori, Kamakura (JP)

(73) Assignee: Hitachi Maxwell, Ltd., Osaka (JP)

( * ) Notice: Subject to any disclaimer, the term of this patent is extended or adjusted under 35 U.S.C. 154(b) by 455 days.

(21) Appl. No.: 12/912,555

(22) Filed: Oct. 26, 2010

(65) Prior Publication Data

US 2011/0242498 A1  Oct. 6, 2011

(30) Foreign Application Priority Data

Mar. 31, 2010  (JP) ................. 2010-080103

(51) Int. Cl.
*G02B 27/48* (2006.01)
*G03B 33/12* (2006.01)
*G02B 27/10* (2006.01)
(Continued)

(52) U.S. Cl.
CPC .............. *G03B 33/12* (2013.01); *G02B 27/104* (2013.01); *G02B 27/48* (2013.01); *G03B 21/14* (2013.01); *H04N 9/3129* (2013.01); *G02F 1/1313* (2013.01); *G02F 1/134336* (2013.01);
(Continued)

(58) Field of Classification Search
CPC . H04N 9/3129; H04N 9/3132; H04N 9/3135; G02F 1/0136; G03B 21/14; G03B 27/48; G03B 27/104
USPC .................................................. 353/20, 121
See application file for complete search history.

(56) References Cited

U.S. PATENT DOCUMENTS 5,313,479 A   5/1994  Florence
5,879,970 A   3/1999  Shiota et al.
(Continued)

FOREIGN PATENT DOCUMENTS

CN   101238735 A    8/2008
CN   201149637 Y   11/2008
(Continued)

OTHER PUBLICATIONS

Chinese Office Action, w/ English translation thereof, issued in Chinese Patent Application No. CN 201010530557.8 dated Jan. 4, 2013.
(Continued)

*Primary Examiner* — Bao-Luan Le
(74) *Attorney, Agent, or Firm* — McDermott Will & Emery LLP

(57) ABSTRACT

A projector using coherent light as a light source includes: one or more coherent light sources emitting coherent light beams; a beam scanner which changes a direction of the coherent light beam; and a beam splitter which splits a beam into multiple segments and changes a phase of light of each split segment, the beam splitter being located in an optical path between the beam scanner and the coherent light source. This projector reduces speckle noises. The beam splitter includes a pair of transparent substrates; a plurality of parallel electrodes disposed on each surface of the pair of transparent substrates, the pair of the parallel electrodes being disposed in a perpendicular direction to each other. Voltages are applied to the respective electrodes at predetermined time intervals so as to produce different potentials in a liquid crystal sandwiched by the transparent substrates.

10 Claims, 10 Drawing Sheets

(51) Int. Cl.
  *G03B 21/14* (2006.01)
  *H04N 9/31* (2006.01)
  *G02F 1/13* (2006.01)
  *G02F 1/1343* (2006.01)
  *G02F 1/141* (2006.01)

(52) U.S. Cl.
  CPC .............. *G02F1/141* (2013.01); *H04N 9/3132* (2013.01); *H04N 9/3135* (2013.01)

(56) References Cited

U.S. PATENT DOCUMENTS

| | | | | |
|---|---|---|---|---|
| 8,899,754 | B2* | 12/2014 | Imai | 353/20 |
| 2003/0011751 | A1 | 1/2003 | Sakata et al. | |
| 2003/0179426 | A1* | 9/2003 | Ide | 359/196 |
| 2007/0153235 | A1* | 7/2007 | Morikawa et al. | 353/20 |
| 2008/0204847 | A1* | 8/2008 | Kamm et al. | 359/238 |
| 2010/0202725 | A1* | 8/2010 | Popovich et al. | 385/10 |
| 2011/0149251 | A1* | 6/2011 | Duelli et al. | 353/38 |
| 2012/0019783 | A1* | 1/2012 | Imai | 353/20 |
| 2012/0182487 | A1 | 7/2012 | Konno | |

FOREIGN PATENT DOCUMENTS

| | | |
|---|---|---|
| JP | 6-208089 | 7/1994 |
| JP | 2003-21800 | 1/2003 |
| JP | 2007-163702 | 6/2007 |
| JP | 2008-191279 A | 8/2008 |
| JP | 4144713 | 9/2008 |
| JP | 2010-152178 A | 7/2010 |
| WO | 2006/133937 A1 | 12/2006 |
| WO | WO-2008/087575 A1 | 7/2008 |
| WO | WO-2011/037039 A1 | 3/2011 |

OTHER PUBLICATIONS

Japanese Office Action issued in Japanese Patent Application No. JP 2010-080103 dated Mar. 19, 2013, with partial English translation thereof.

Japanese Office Action issued in Japanese Patent Application No. JP 2010-080103 dated Jun. 25, 2013.

* cited by examiner

FIG. 7A

ELECTRODE POTENTIAL AND POTENTIAL DIFFERENCE IN EACH CELL IN n-TH DISPLAY FRAME

|       | 446 1 | 447 0 | 448 0 | 449 1 | 450 1 |
|-------|-------|-------|-------|-------|-------|
| 441 1 | 0     | 1     | 1     | 0     | 0     |
| 442 0 | 1     | 0     | 0     | 1     | 1     |
| 443 1 | 0     | 1     | 1     | 0     | 0     |
| 444 0 | 1     | 0     | 0     | 1     | 1     |
| 445 0 | 1     | 0     | 0     | 1     | 1     |

FIG. 7B

ELECTRODE POTENTIAL AND POTENTIAL DIFFERENCE IN EACH CELL IN (n+1)TH DISPLAY FRAME

|       | 446 1 | 447 1 | 448 0 | 449 0 | 450 1 |
|-------|-------|-------|-------|-------|-------|
| 441 0 | 1     | 1     | 0     | 0     | 1     |
| 442 1 | 0     | 0     | 1     | 1     | 0     |
| 443 0 | 1     | 1     | 0     | 0     | 1     |
| 444 1 | 0     | 0     | 1     | 1     | 0     |
| 445 0 | 1     | 1     | 0     | 0     | 1     |

FIG. 9A

ELECTRODE POTENTIAL AND POTENTIAL DIFFERENCE IN EACH CELL IN n-TH DISPLAY FRAME

|       | 446 3 | 447 2 | 448 0 | 449 1 | 450 2 |
|-------|-------|-------|-------|-------|-------|
| 441 1 | 2 | 1 | 1 | 1 | 1 |
| 442 0 | 2 | 2 | 0 | 1 | 2 |
| 443 2 | 1 | 2 | 2 | 1 | 0 |
| 444 3 | 0 | 2 | 3 | 2 | 1 |
| 445 0 | 2 | 2 | 0 | 1 | 2 |

FIG. 9B

ELECTRODE POTENTIAL AND POTENTIAL DIFFERENCE IN EACH CELL IN (n+1)TH DISPLAY FRAME

|       | 446 1 | 447 3 | 448 2 | 449 0 | 450 1 |
|-------|-------|-------|-------|-------|-------|
| 441 2 | 1 | 2 | 0 | 2 | 1 |
| 442 3 | 2 | 0 | 1 | 3 | 2 |
| 443 0 | 1 | 2 | 2 | 0 | 1 |
| 444 1 | 0 | 2 | 1 | 1 | 0 |
| 445 0 | 1 | 2 | 2 | 0 | 1 |

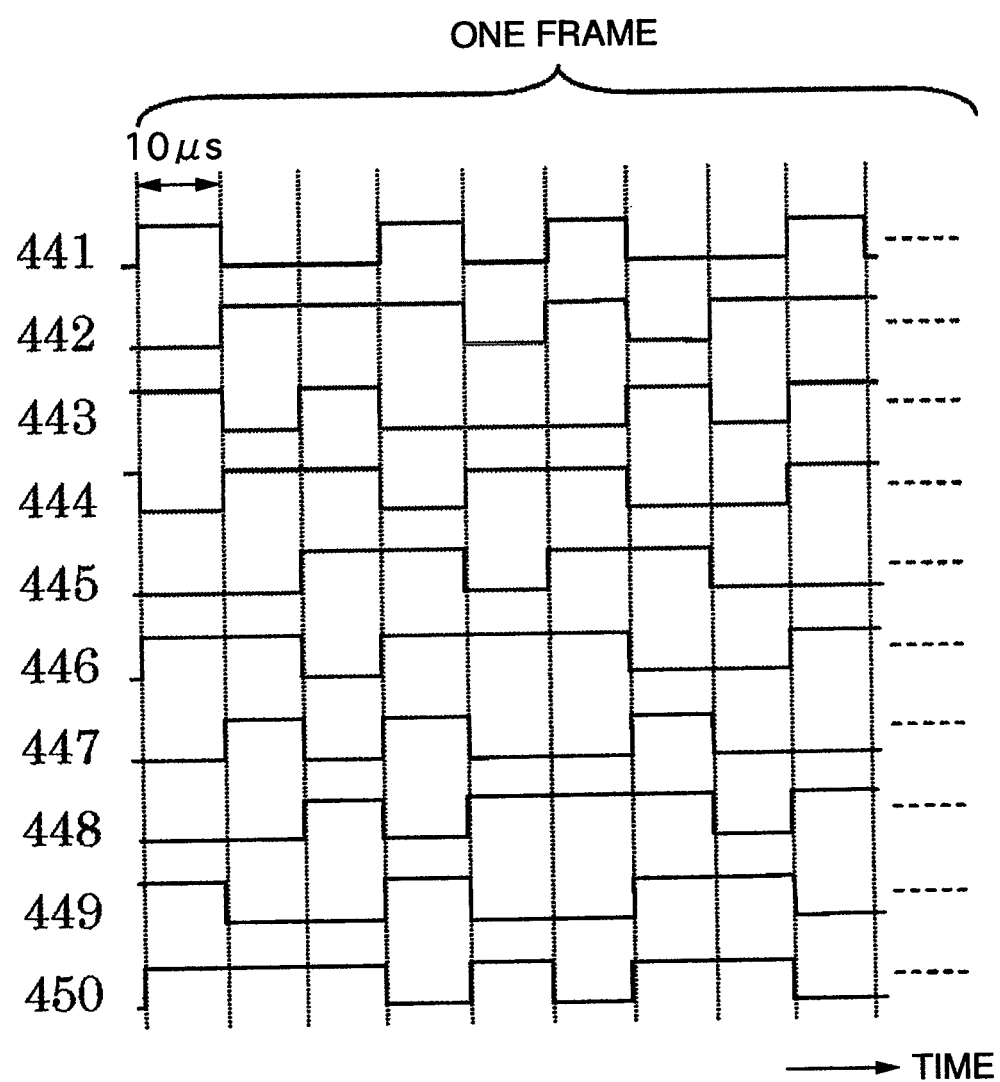

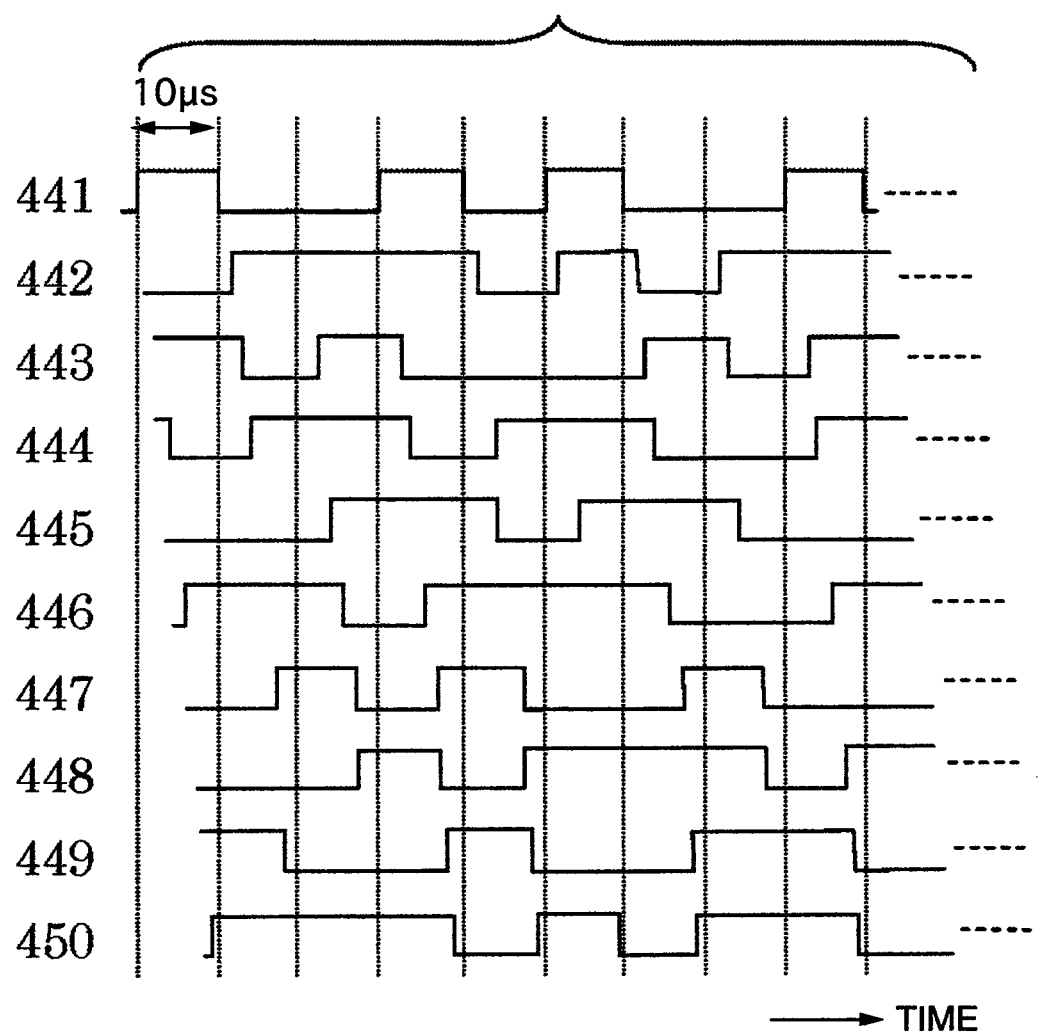

LASER PROJECTOR WITH REDUCED SPECKLE

CROSS REFERENCE TO RELATED APPLICATION

This application claims priority from Japanese Patent Application JP-2010-80103, filed on Mar. 31, 2010, the content of which is hereby incorporated by reference into this application.

BACKGROUND OF THE INVENTION

The present invention relates to display systems which display a video by modulating and scanning a light beam from a coherent light source such as a laser light source in accordance with video signals, and relates to techniques to reduce speckle noises at the time of display.

A laser display system is proposed in JP-A-2003-021800, for example, in which a video is displayed on a screen by emitting three color laser beams to an operating mirror and reflecting the three color laser beams. In such a laser display system, the use of the high coherent laser beam causes a speckle phenomenon that a random spotted pattern is generated, and thus the quality as a display becomes an issue.

In order to suppress such speckle phenomenon, there is a method of mechanically vibrating an optical path as shown in JP-B-4144713, for example, however, the frequency is insufficient for sufficiently reducing the speckle and thus the speckle reduction effect is small.

As the other display systems using the laser beam, a method is also proposed as shown in JP-A-06-208089, in which an image modulated by an optical modulator is enlarged and projected in accordance with image information. This method also has a problem of the speckle. With regard to this problem, JP-A-2007-163702 proposes a speckle canceller comprising a pair of transparent substrates and a liquid crystal sealed therebetween.

SUMMARY OF THE INVENTION

FIG. 3 illustrates a relationship between a laser beam and a screen when the whole laser beam is fluctuated as in JP-04144713. In the case of a laser scanning display system similar to that of JP-A-2003-021800, speckles are generated reflecting unevenness of a screen 100 in a range where one beam 90 is projected to the screen 100. If the projection range on the screen 100 shifts from the beam 90 before fluctuation to a beam 91 after fluctuation and overlaps by a length "a", then the shape of the unevenness does not change in the range of "a" and accordingly the speckle does not change, either. That is, in the method according to JP-A-04144713, the larger the amplitude of the fluctuation and the smaller the overlap of the beam before and after fluctuation, the larger the speckle reduction effect becomes. However, at the same time, there is a problem that the blurring of the image is large as a side effect.

It is an object of the present invention to solve the above-described problems and provide a high definition laser display system capable of reducing the speckles of the laser beam.

In order to solve the above-described problems, a projector using coherent light as a light source according to the present invention comprises: one or more coherent light sources emitting coherent light; a beam scanner which changes the direction of a beam obtained from the coherent light source; and a beam splitter which splits the beam into a plurality of segments and changes a phase of light of each split segment, the beam splitter being located in an optical path between the beam scanner and the coherent light sources.

Here, the beam splitter comprises: a pair of transparent substrates; a plurality of first parallel electrodes disposed on one of the transparent substrates and a plurality of second parallel electrodes disposed on the other one of the transparent substrates, the first parallel electrodes being disposed in a direction perpendicular to the second parallel electrodes; and a liquid crystal enclosed between the transparent substrates, wherein voltages are applied to the respective electrodes at predetermined time intervals so as to produce different potentials in the liquid crystal sandwiched by the transparent substrates.

According to the present invention, apparent speckles of a laser beam can be reduced, and therefore a high definition laser projector capable of suppressing degradation in the image quality due to the speckles can be provided.

BRIEF DESCRIPTION OF THE DRAWINGS

FIG. 7A is a diagram representing each electrode potential and a potential difference in each cell in an n-th display frame.

FIG. 7B is a diagram representing each electrode potential and a potential difference in each cell in an (n+1)th display frame.

FIG. 9A is a diagram representing each electrode potential and a potential difference in each cell in the n-th display frame according to a second embodiment.

FIG. 9B is a diagram representing each electrode potential and a potential difference in each cell in the (n+1)th display frame according to the second embodiment.

FIG. 10 is a chart of voltage waveforms applied to respective electrodes according to a third embodiment.

FIG. 11 is a chart of voltage waveforms applied to respective electrodes according to a fourth embodiment.

DETAILED DESCRIPTION OF THE EMBODIMENTS

Figure 2:
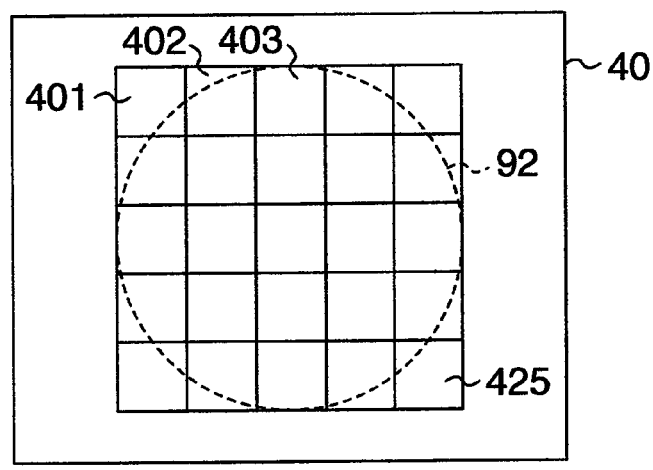
FIG. 2 is a view illustrating how to split a laser beam.
Figure 3:
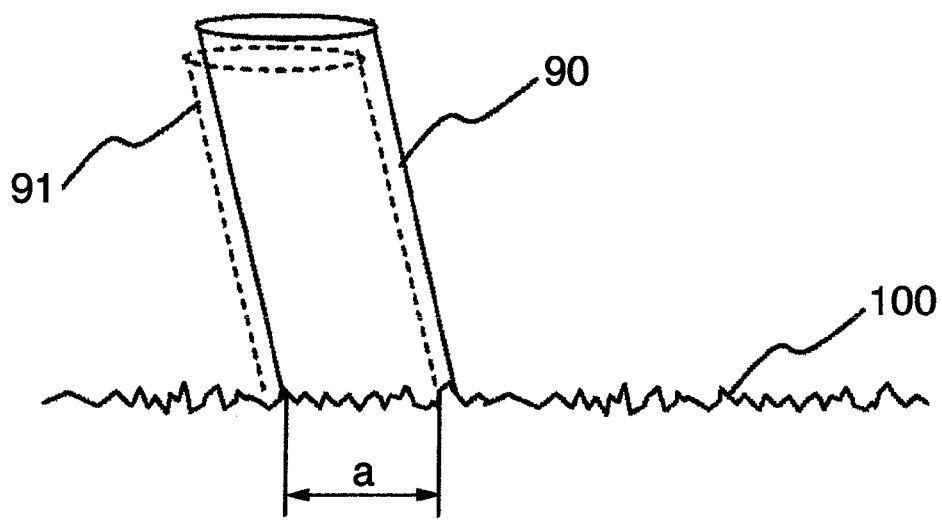
FIG. 3 is an explanatory view when the whole beam is fluctuated.

In the present invention, a laser beam 92 to be projected is split into a plurality of beam regions in a beam cross section as illustrated in FIG. 2, and the optical phase of each split beam is differentiated from each other, and in addition, their phase states are dynamically varied, thereby scattering speckles generated and also reducing the speckles by averaging the speckles over time.

Figure 4:
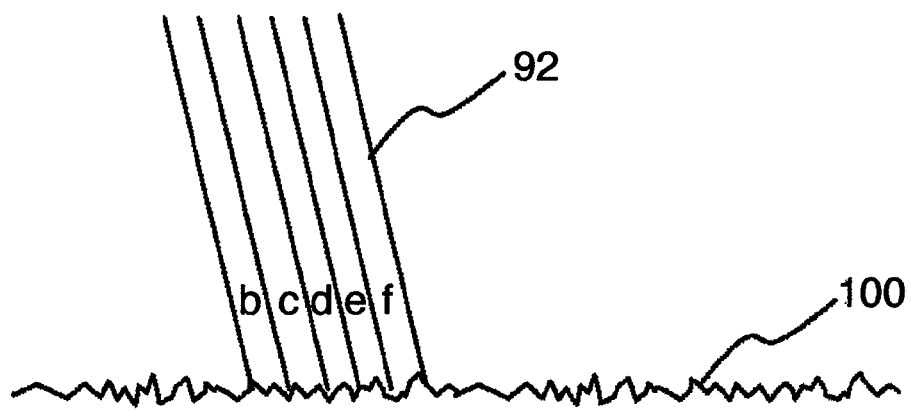
FIG. 4 is an explanatory view when a beam is split and fluctuated.
Figure 5:
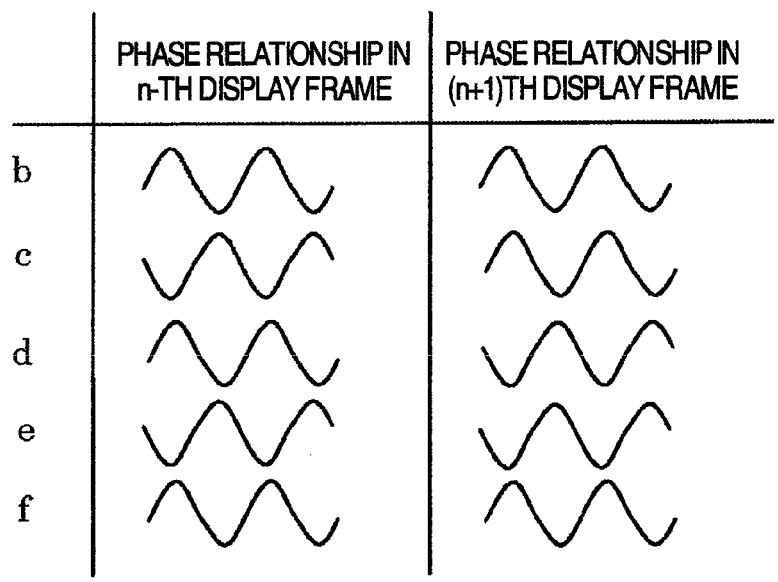
FIG. 5 is a view representing a phase relationship between split beams.

For example, as illustrated in FIG. 4, the beam 92 is split into five beam regions b, c, d, e, and f, and a phase relationship among the five regions in an n-th display frame differs from a phase relationship in an (n+1)th display frame as represented in FIG. 5. For this reason, a speckle pattern in the n-th display frame differs from a speckle pattern of the (n+1)th display frame, and as a result, a reduced speckle can be seen because these speckle patterns are averaged over time in terms of human's recognition.

In this example, the phase states are varied by a unit of a frame, and as a result, in the case of a video including a moving object, the speckle reduction effect is small because the speckles cannot be averaged over time. Ideally, the speckle reduction effect at the time of a motion picture becomes greater if the phase relationship is varied while a beam is scanning one dot. Although one beam is split into five regions in this example, the more the number of split regions, the greater the effect becomes.

Figure 6:
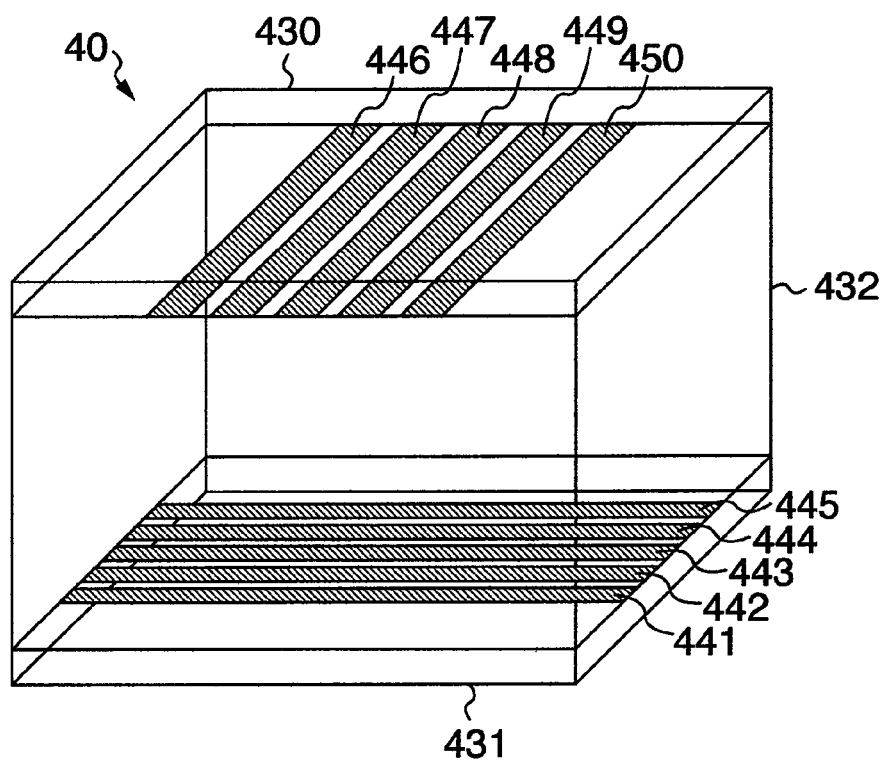
FIG. 6 illustrates a configuration diagram of a beam splitter.
Figure 14:
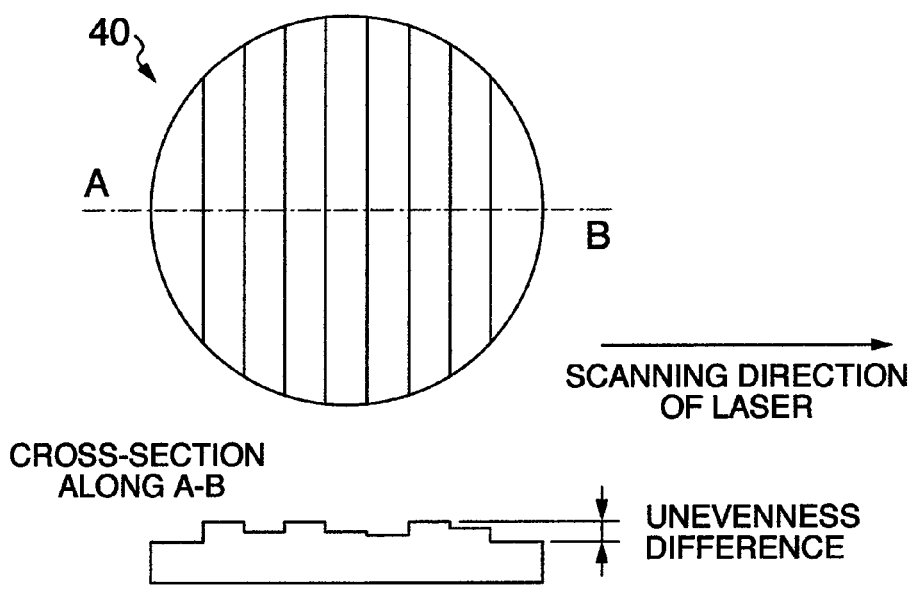
FIG. 14 is a view illustrating a glass plate in a seventh embodiment.

For means for splitting the beam and varying the optical phase, a method of using a liquid crystal cell illustrated in FIG. 6 may be used, or a device to which a MEMS (Mechanical Electro Micro System) is applied or a device using an electrooptic crystal may be used. In addition, a glass plate having uneven cross-section as illustrated in FIG. 14 may be used. Hereinafter, more specific configurations will be described with reference to the accompanying drawings.

Embodiment 1

Figure 1:
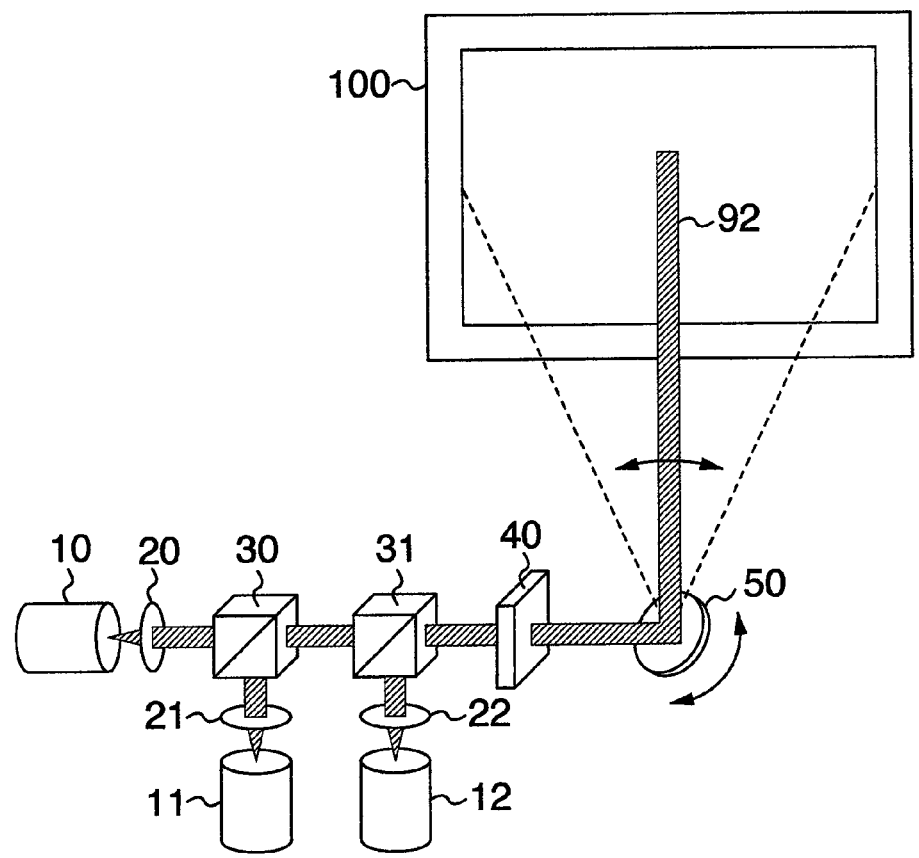
FIG. 1 illustrates an overall configuration of a display system according to a first embodiment.

FIG. 1 is a view illustrating an overall configuration of a display system according to a first embodiment. The display system of the first embodiment combines laser beams of red and blue and green semiconductor lasers modulated with video signals, and displays a video by scanning the resultant RGB-combined laser beam onto a screen 100 using an MEMS mirror 50. More specifically, a beam emitted from a green laser 10 is shaped by a collimation lens 20 into a substantially parallel beam, which is then incident upon a beam splitter 40 through a dichroic prism 30 and a dichroic prism 31 and are scanned onto the screen 100 by the MEMS mirror 50.

Similarly, a beam emitted from a red laser 11 is shaped by a collimation lens 21 into a substantially parallel beam, which is then reflected by the dichroic prism 30 and is incident upon the beam splitter 40 through the dichroic prism 31. A beam emitted from a blue laser 12 is shaped by a collimation lens 22 into a substantially parallel beam, which is then reflected by the dichroic prism 31 and is incident upon the beam splitter 40.

Next, the beam splitter 40 is described. In the beam splitter 40, as illustrated in FIG. 2, the incident RGB mixed laser beam is split into 5×5 segments 401 to 425. Then, a beam passing through each segment will have an individual phase. For example, the beam size of each color is 1.0 mm in diameter on the beam splitter 40, and each segment is divided at the pitch of 0.2 mm.

FIG. 6 illustrates a configuration diagram of the beam splitter 40. The beam splitter 40 comprises a pair of substrates 430, 431 and a liquid crystal 432 filled therebetween. Electrodes 446-450 are formed on a lower surface of the substrate 430, and electrodes 441-445 are formed on a upper surface of the substrate 431 in a direction perpendicular to the electrodes 446-450. The region sandwiched by the upper and lower electrodes corresponds to the 5×5 segments 401 to 425 in FIG. 2.

The liquid crystal 432 operates as a phase modulation device, in which the voltages applied between the upper and lower electrodes produce a potential difference between the upper and lower electrodes, and this potential difference controls the phase of a laser beam passing through the liquid crystal.

FIGS. 7A, 7B represent examples of the voltages applied to each electrode of the n-th display frame and the (n+1)th display frame and potential differences between the electrodes of the upper and lower substrates in each segment. Though, for convenience's sake, an ON state is indicated by 1 and an OFF state is indicated by 0, the actual voltages are in a range of 5-20V. By randomly setting the voltage of each electrode, the potential difference in each segment is also randomly set. Moreover, by randomly setting the voltage of each electrode between the n-th display frame and the (n+1)th display frame, the potential difference in each segment is also randomly set. The direction of the filled liquid crystal varies depending on whether or not there is a potential difference in each segment, and accordingly the refractive index varies, and thus the phase varies when light passes through the filled liquid crystal.

Figure 8:
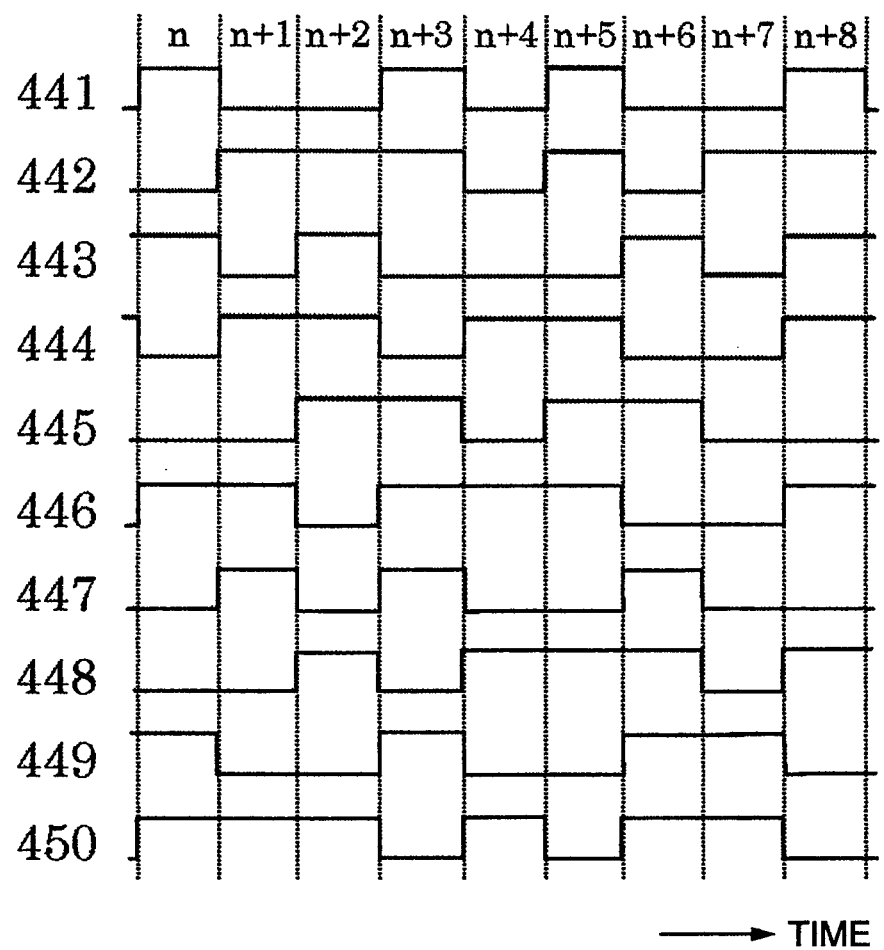
FIG. 8 is a chart of voltage waveforms applied to respective electrodes according to the first embodiment.

As represented in FIG. 8, the electrode potential and the potential difference of a segment continue to randomly vary in the (n+2)th frame and thereafter. FIG. 8 represents a timing of a voltage waveforms applied to respective electrodes, wherein the voltage waveforms of all the electrodes are switched at each frame. Moreover, the voltage of one electrode is not varied within the display time of one frame.

In this way, the phase of the laser beam passing through the adjacent segments varies spatially or temporally at random, whereby a different speckle pattern appears in the unit of display frame and therefore the speckle is diffused and reduced in terms of the human visual sense.

Embodiment 2

Next, a second embodiment is described with reference to FIGS. 9A, 9B. The second embodiment is an example, in which the laser beam phase control of the beam splitter 40 is different from the first embodiment. The configuration of a display system applied is the same as that of the first embodiment, and the description thereof is omitted.

FIGS. 9A, 9B represent an example of voltages applied to each electrode of the n-th display frame and the (n+1)th display frame and a potential difference between the electrodes of the upper and lower substrates in each segment. The second embodiment differs from the first embodiment in that a multivalued voltage is applied to each electrode. In FIGS. 9A, 9B, if four values 0 to 3 are used for each electrode voltage, the potential difference of each segment can be controlled in multiple values and the phase of a laser beam can be controlled more finely than the first embodiment. Moreover, in the second embodiment, the above-described beam splitting and phase control of the laser beam are performed in the unit of a frame as in the first embodiment.

Embodiment 3

In the first embodiment and second embodiment, the examples have been described in which the beam splitting and phase control of a laser beam is performed in the unit of a frame. However, if a ferroelectric liquid crystal is used for the liquid crystal 432 of the beam splitter 40, the unit of phase control can be more finely divided. Thus, the speckle noise can be further diffused in time scale, and as a result, the speckle noise is effectively reduced.

FIG. 10 represents voltage waveforms applied to respective electrodes when a ferroelectric liquid crystal is used for the beam splitter to increase the modulation frequency and the waveform is changed at each 10 µS. When the waveform is changed at each frame, the speckle is changed by the time integration of a plurality of frames and therefore the speckle reduction effect is small in the case of a video including motions. However, by changing the phase of a laser beam a plurality of times within one frame, the speckle reduction effect in the case of the video including motions can be increased.

Embodiment 4

In Embodiment 3, a voltage is applied to each electrode at the same timing, however, as represented in FIG. 11, the voltage application timing may be shifted for each electrode. Since the phase of the voltage waveform applied to the electrode is shifted, the variation of the speckle generated in one frame further increases, so that even in the case of the video including motions, the speckle reduction effect can be increased more than the third embodiment.

Embodiment 5

Figure 12:
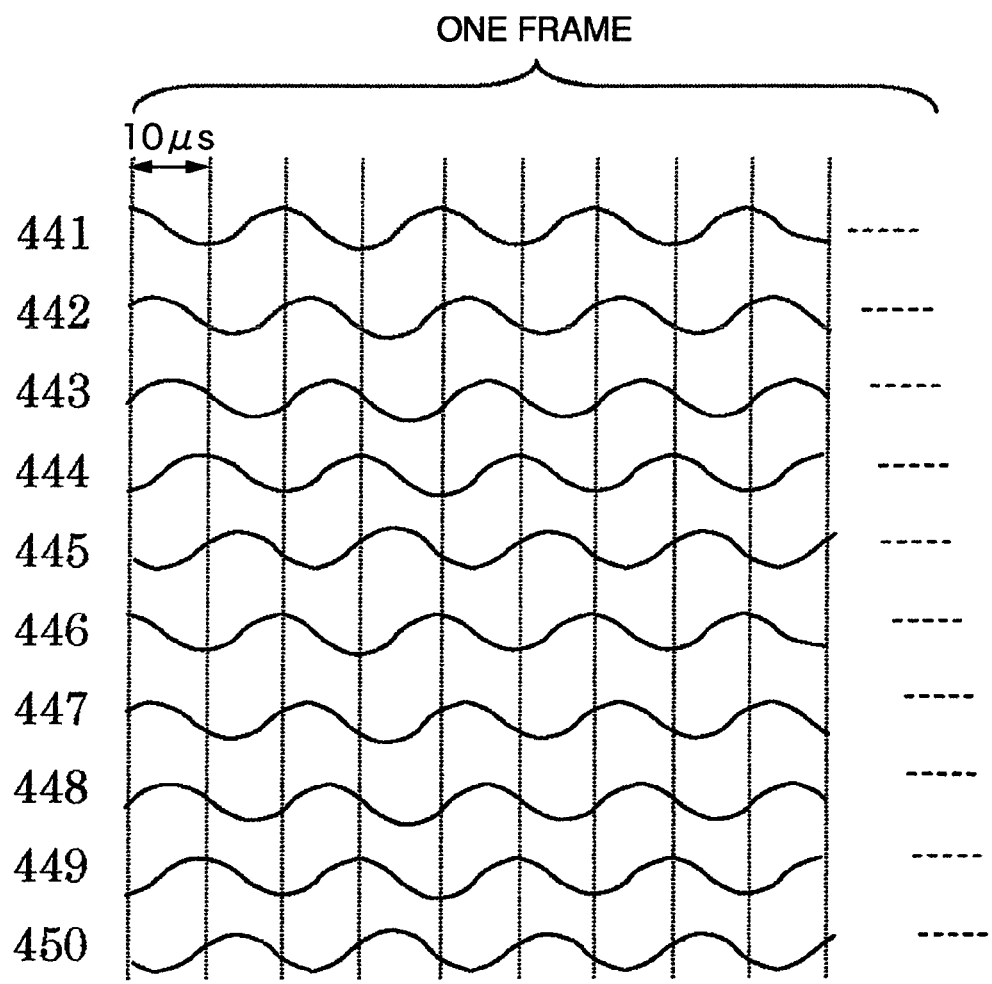
FIG. 12 is a chart of voltage waveforms applied to respective electrodes according to a fifth embodiment.

Although Embodiments 1 to 4 represented the examples in which the voltage waveform applied to each electrode utilizes square waves as represented in FIG. 12, sine waves whose phases are shifted for each electrode may be used. In this case, the direction of the liquid crystal 432 of the beam splitter 40 smoothly varies, and therefore the same effect as the case where the phase of a laser beam is shifted by a number of times equal to or greater than the number of splits, can be obtained. Note that, in FIG. 12, although the phase is gradually shifted in the order of the rows or columns, the amount of phase shift may not be fixed.

Embodiment 6

Figure 13:
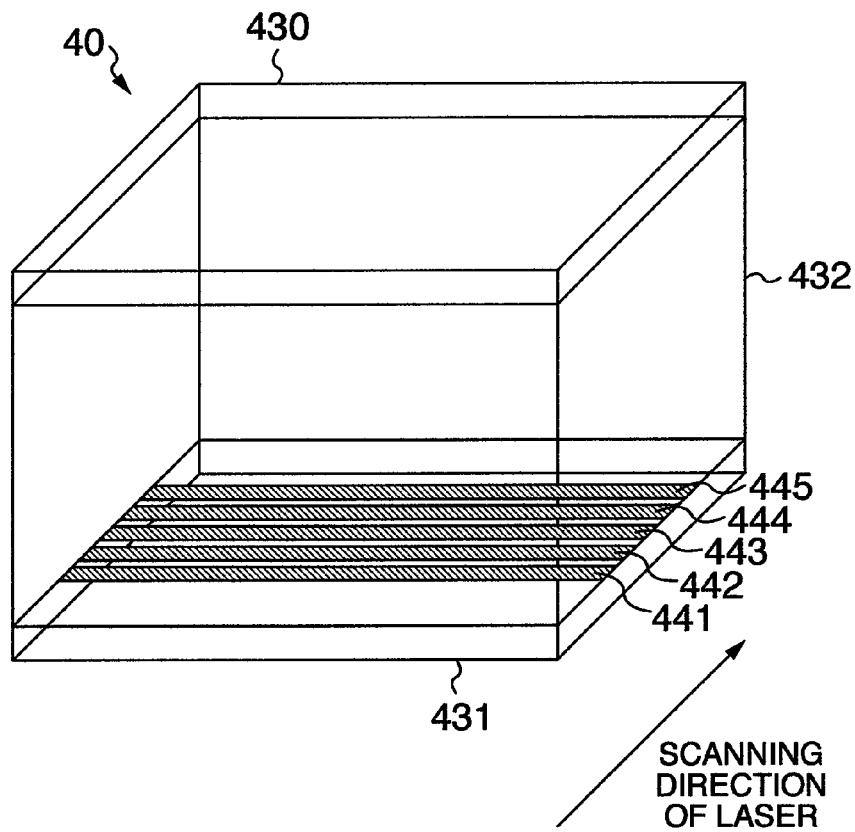
FIG. 13 is a view illustrating the shape of each electrode in a sixth embodiment.

Although Embodiments 1 to 5 showed the examples of the beam splitter 40 illustrated in FIG. 6, the electrodes may be formed only on one side as illustrated in FIG. 13. In this case, preferably, the direction of the electrodes is substantially perpendicular to the direction in which the laser beam is scanned. This is because the split beams whose phases vary according to a voltage waveform are sequentially emitted when observed from one point on the screen 100.

Embodiment 7

Although Embodiments 1 to 6 represented the example of the beam splitter 40 having electrodes, a glass plate having uneven cross-section without electrodes as illustrated in FIG. 14 may be used. This embodiment uses an effect that the phase varies if there is a difference in the thickness of glass when a beam passes through the glass. Differences between the unevenness are preferably equal to or greater than a half of the maximum wavelength of the beam passing through the glass. In this view, the glass plate has a striped unevenness in the vertical direction, however, the shape of the glass plate is not particularly limited, and the glass plate may have unevenness in a matrix. When the glass plate has the striped unevenness, preferably the direction of the unevenness is substantially perpendicular to the direction in which the laser beam is scanned. This is because the split beams whose phases vary according to a voltage waveform are sequentially emitted when observed from one point on the screen 100. In addition, a method may be used, wherein instead of using glass, a mirror having the same shape as that of the glass is used and a laser beam is reflected by the mirror and the resultant reflected laser beam is applied.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projector for projecting a video including motions, using coherent light as a light source, the projector comprising:

one or more coherent light sources emitting a coherent light beam;
a beam scanning unit which changes a direction of the coherent light beam emitted from the one or more coherent light sources; and
a beam splitter which splits the coherent light beam into multiple segments and changes a phase of light of each split segment, the beam splitter being located in an optical path between the beam scanning unit and the one or more coherent light sources, wherein:
the beam splitter splits the coherent light beam two-dimensionally both in a scanning direction in which the coherent light beam is scanned by the beam scanning unit and in a direction perpendicular to the scanning direction,
the beam splitter comprises:
a pair of transparent substrates;
a plurality of first parallel electrodes disposed on one of the pair of transparent substrates and a plurality of second parallel electrodes disposed on the other one of the pair of transparent substrates, the first parallel electrodes being disposed in a direction perpendicular to the second parallel electrodes; and
a liquid crystal enclosed between the transparent substrates, wherein:
voltages are applied to the first and second parallel electrodes at each predetermined time intervals shorter than a frame time so as to produce different potentials in the liquid crystal enclosed between the transparent substrates,
the voltage applied to each electrode of the first parallel electrodes and the second parallel electrodes is randomly set at each of the predetermined time intervals, and
a phase of a voltage waveform when the voltage is applied is shifted for each electrode of the first parallel electrodes and the second parallel electrodes at a time period which is shorter than the predetermined time intervals.

2. The projector according to claim 1, wherein for the voltages applied to the electrodes, multiple level voltage is applied.

3. The projector according to claim 1, wherein:
the liquid crystal of the beam splitter is a ferroelectric liquid crystal.

4. The projector according to claim 1, wherein: the liquid crystal of the beam splitter is a ferroelectric liquid crystal, and the phase of the voltage waveform has a timing difference shorter than a voltage application cycle.

5. The projector according to claim 1, wherein voltages of square waveforms are applied to each of the first and second parallel electrodes.

6. The projector according to claim 5, wherein voltages of square waves with a different timings are applied to each of the first and second parallel electrodes.

7. The projector according to claim 1, wherein voltages of a sine waveform with different phases are applied to each of the first and second parallel electrodes.

8. The projector according to claim 1, wherein the beam splitter linearly splits the coherent light beam in the direction perpendicular to the scanning direction in which the coherent light beam is scanned by the beam scanning unit.

9. The projector according to claim 1, wherein the beam splitter linearly splits the coherent light beam in either the scanning direction in which the coherent light beam is scanned by the beam scanning unit or the direction perpendicular to the scanning direction.

10. A projector for projecting a video including motions, the projector comprising:
   a red laser source emitting a red collimated light beam;
   a blue laser light source emitting a blue collimated light beam;
   a green laser source emitting a green collimated light beam;
   a first dichroic prism which allows the light beam from the green laser source to pass therethrough and reflects the light beam from the red laser source;
   a second dichroic prism which allows a light beam passed through the first dichroic prism to pass therethrough and reflects the light beam from the blue laser light source;
   a beam splitter which splits a first light beam passed through the second dichroic prism into a plurality of light beams and performs phase modulation of the split light beams; and
   a MEMS mirror which scans a light beam emitted from the beam splitter onto a screen, wherein:
   the beam splitter splits the first light beam two-dimensionally both in a scanning direction in which the first light beam is scanned by the beam scanning unit and in a direction perpendicular to the scanning direction,
   the beam splitter comprises:
      a pair of transparent substrates;
      a plurality of first parallel electrodes disposed on one of the pair of transparent substrates and a plurality of second parallel electrodes disposed on the other one of the pair of transparent substrates, the first parallel electrodes being disposed in a direction perpendicular to the second parallel electrodes; and
      a liquid crystal enclosed between the transparent substrates, wherein:
   voltages are applied to the first and second parallel electrodes at each predetermined time intervals shorter than a frame time so as to produce different potentials in the liquid crystal enclosed between the transparent substrates,
   the voltage applied to each electrode of the first parallel electrodes and the second parallel electrodes is randomly set at each of the predetermined time intervals, and
   a phase of a voltage waveform when the voltage is applied is shifted for each electrode of the first parallel electrodes and the second parallel electrodes at a time period which is shorter than the predetermined time intervals.

* * * * *

UNITED STATES PATENT AND TRADEMARK OFFICE
CERTIFICATE OF CORRECTION

PATENT NO. : 9,122,145 B2  
APPLICATION NO. : 12/912555  
DATED : September 1, 2015  
INVENTOR(S) : Tadayoshi Kosaka et al.

It is certified that error appears in the above-identified patent and that said Letters Patent is hereby corrected as shown below:

On the title page item (73) please amend as follows:

(73) Assignee: Hitachi Maxell, Ltd., Osaka (JP)

Signed and Sealed this
Nineteenth Day of April, 2016

Michelle K. Lee
*Director of the United States Patent and Trademark Office*